United States Patent [19]
Therrien

[11] 3,847,352
[45] Nov. 12, 1974

[54] WELDING APPARATUS

[75] Inventor: John A. Therrien, Sarnia, Ontario, Canada

[73] Assignee: The Raymond Lee Organization, New York, N.Y. ; a part interest

[22] Filed: Aug. 21, 1973

[21] Appl. No.: 390,211

[52] U.S. Cl. ............................. 239/133, 266/23 P
[51] Int. Cl. ............................................ F23d 15/00
[58] Field of Search.................... 239/133, 134, 135; 266/23 R, 23 P, 23 T; 431/4, 127

[56] References Cited
UNITED STATES PATENTS

| | | | |
|---|---|---|---|
| 3,229,409 | 1/1966 | Johnson | 239/133 X |
| 3,485,176 | 12/1969 | Telford et al. | 239/135 X |
| 3,737,626 | 6/1973 | Davis et al. | 239/135 X |

Primary Examiner—Lloyd L. King
Assistant Examiner—Michael Mar

[57] ABSTRACT

Apparatus adapted to weld or join pieces of plastic together employing a heated gas which does not react chemically with the pieces but is directed thereon to heat same and produce welding. The gas is supplied from an unheated source and is discharged through a discharge tip. Additional means, which can be a propane torch, heats the gas to desired temperature prior to discharge.

2 Claims, 8 Drawing Figures

PATENTED NOV 12 1974 3,847,352

WELDING APPARATUS

SUMMARY OF THE INVENTION:

In my invention, I provide a hollow coil having a discharge tip at one end and an inlet at an opposite end. First means is connected to the inlet to pass a first gas through the coil under pressure for release through the tip. This first gas is not chemically reactive with pieces of plastic to be welded. Second means applies heat to the coil whereby the first gas is heated to desired temperature prior to discharge.

The flow of heated gas thus produced can be used to heat two pieces of plastic, with or without an added plastic filler, to weld or fuse same together into an integral structure.

Figure 1:
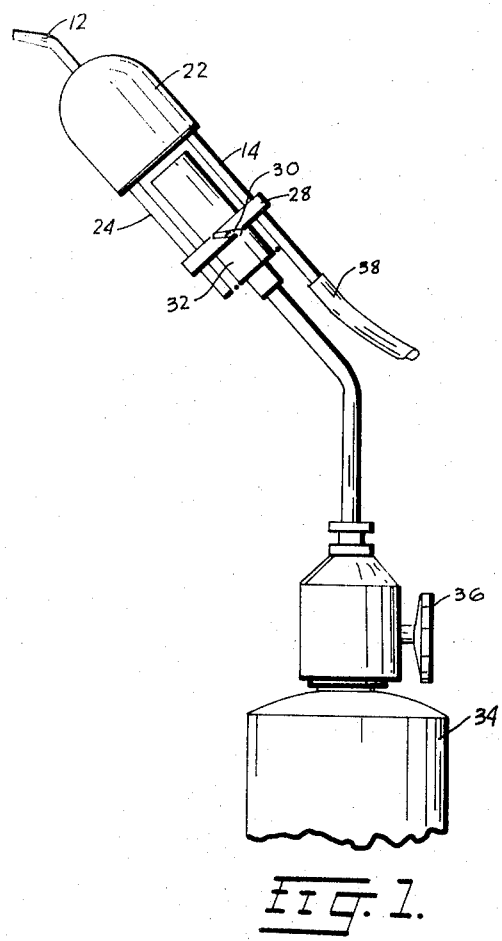
FIG. 1 is a perspective view of my invention with one part not connected.
Figure 2:
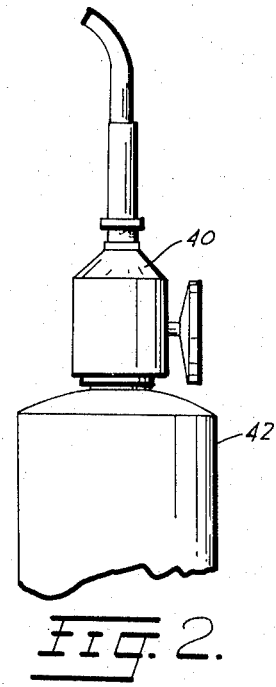
FIG. 2 is a view of the part not connected in FIG. 1.
Figure 3:
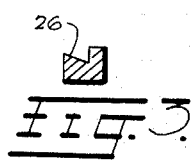
FIG. 3 is an enlarged view of a step on a cap.

DETAILED DESCRIPTION OF PREFERRED EMBODIMENTS:

Referring first to FIGS. 1–4 and 6–7, a hollow coil 10 has one end formed into a tip 12 and an opposite end forming a leg 14 secured to a hole 16 in the periphery of a cap 18 having a step 26. A hollow shell 20 having an opening 22 through which tip 12 passes surrounds coil 10 and is connected via a dead leg 24 opposite to leg 14 to cap 18. The cap is secured within a collar 28 by tightening thumb screw 30. A pencil type burner 32 for light duty (a blow torch can be used for heavy work) is disposed within the collar and cap to produce a flame powered by propane gas in tank 34 and controlled by valve 36. This flame heats the interior of coil 10. Leg 14 is connected via hose 38 to the discharge valve 40 on a tank 42 containing nitrogen, argon or other gas chemically inert with respect to the plastic pieces which are to be joined welded or fused with or without the use of plastic filler rods of the same material as previously described. The flame heats this inert gas as it flows through the coil whereby it attains proper heating temperature prior to discharge.

Figure 5:
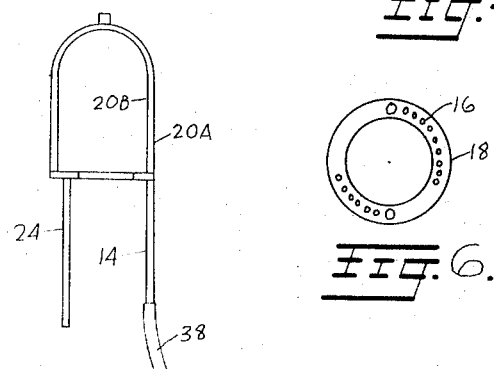
FIG. 5 is a detail view of a mechanism differing from that shown in FIG. 4.
Figure 6:
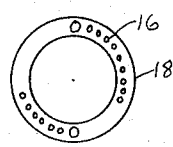
FIG. 6 is a cross section taken along line 6—6 in FIG. 4.
Figure 7:
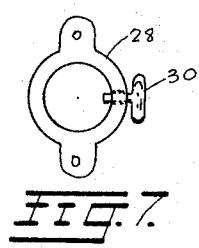
FIG. 7 is a cross section taken along line 7—7 in FIG. 4.

FIG. 5 shows a modification using a double shell having outer shell 20A and inner shell 20B.

Figure 8:
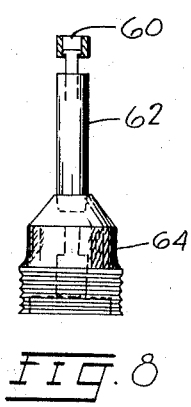
FIG. 8 shows an adapter which can be used in my invention.
Figure 4:
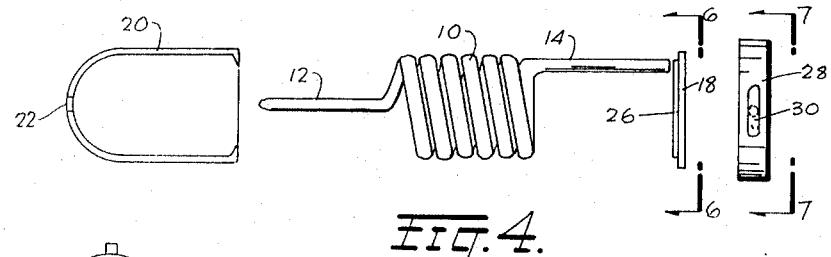
FIG. 4 is an exploded view of shell, coil, cap and collars.

Under certain circumstances and plastics the inert gas in tank 42 can be substituted for air under pressure. When a source of pressurized air is not otherwise available, the attachment shown in FIG. 8 can be used to release air from a spare tire or the like. Adaptor 60 which can fit the valve of the tire is connected by tubing 62 to a fitting 64 adapted to receive valve 40 which can be connected via hose 38 to leg 14 as previously described.

While I have described my invention with particular reference to the drawings, such is not to be considered as limiting its actual scope.

Having thus described this invention, what is asserted as new is:

1. Welding apparatus adapted to weld plastics and comprising:
    a hollow coil having a discharge tip at one end and an inlet at an opposite end;
    first means connected to said opposite end to pass a first gas through said coil under pressure for release through said tip, said first gas being chemically nonreactive with plastics; and
    second means to apply heat to said coil to heat the first gas prior to release, said second means including a torch and fuel therefor, said fuel being a second gas.

2. Apparatus as set forth in claim 1 further including a hollow heat shield encasing said coil and having an opening through which said tip extends.

* * * * *